July 29, 1952        A. H. FRIEDMAN        2,605,234
REGENERATION OF A CARBONIZED FISCHER-TROPSCH CATALYST
Filed Dec. 1, 1947
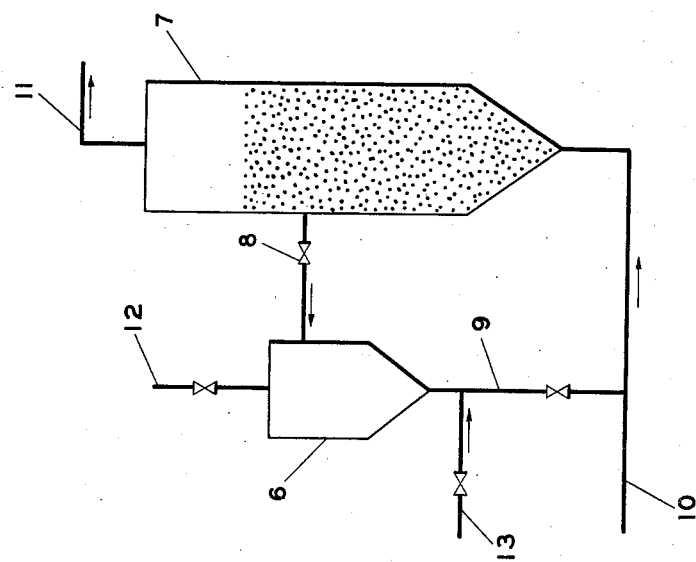
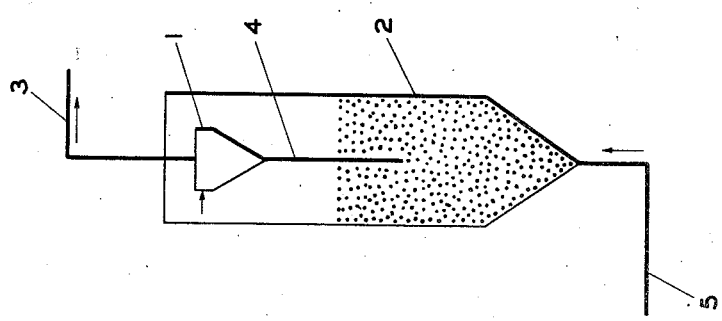
INVENTOR.
ALVIN H. FRIEDMAN
BY *Hudson & Young*
ATTORNEYS Patented July 29, 1952

2,605,234

UNITED STATES PATENT OFFICE 2,605,234

REGENERATION OF A CARBONIZED FISCHER-TROPSCH CATALYST

Alvin H. Friedman, Kansas City, Mo., assignor to Phillips Petroleum Company, a corporation of Delaware Application December 1, 1947, Serial No. 788,983

8 Claims. (Cl. 252—411)

This invention relates to catalysts and to catalytic processes and more particularly to an improved process for reactivating or regenerating catalysts whose efficiency has been decreased by the deposition of carbonaceous materials on the surface of the catalyst particles during a hydrocarbon conversion reaction. In a more specific aspect, the present invention relates to the reactivation of metallic catalysts which have been deactivated by the surface deposition of carbonaceous or other deposits thereon.

This invention is particularly applicable to the catalytic synthesis of hydrocarbons from a synthesis gas composed mainly of hydrogen and carbon monoxide in which a finely divided metallic catalyst is employed. Usually a finely divided iron catalyst is employed in the reaction zone, and the velocity of the influent synthesis gas causes the particles of the finely divided catalyst to become suspended in the gases in the reaction zone. Under properly controlled conditions the catalyst will assume a state of fluidity, and the suspended catalyst will act similar to and can be treated as a fluid in many respects. The reaction can be carried out at substantially elevated temperatures, and as a result of the elevated temperature and of the high activity of a powdered catalyst, high space velocities in terms of the volume of gas per volume of catalyst per hour can be used. These space velocities may be ten or more times as high as the velocities employed with the conventional fixed-bed operation. The highly exothermic reaction is easily controlled at these conditions because the fluid nature of the catalyst spreads the heat of reaction evenly throughout the catalyst bed and allows good heat transfer to the cooling surfaces of the reactor and the cooling devices within it.

During the synthesis reaction there is a tendency toward the deposition of carbonaceous material on the surface of the catalyst particles, and at elevated temperatures and high catalyst activity the tendency of the catalyst to produce carbon is intensified. Further, if the cooling is insufficient or fails entirely, the temperature of the reactor may rise rapidly and almost instantaneously with the resulting deposition of quantities of carbon on the catalyst surface.

When the carbon deposits on the catalyst surface become excessive, it is possible to remove the deposits by various methods. One process consists of introducing sufficient oxygen into either the reactor or a regenerating chamber to burn off the deposit, and, in the case of Fischer-Tropsch iron catalysts, the burning is followed by fusion of the catalyst and reduction with hydrogen at high temperatures.

I have found that, in the practice of this invention, the carbonaceous deposit can be easily and continuously removed without the necessity of removal by oxidation and without removing the catalyst from the reactor.

In accordance with the present invention, the carbonaceous deposits referred to are removed from the catalyst by passing upward through the catalyst mass a gas under such conditions that oxidation of the catalyst does not result and at a velocity sufficiently high that the carbon deposits on the surface of the catalyst, due to the light, soft character of the carbon as compared to the hard, dense nature of the catalyst, are abraded from the catalyst and carried out in the effluent gas stream by the velocity of the stream. If means of separation and return of the catalyst to the reactor are provided, such as a Cyclone separator or a screen, it has been found that the catalyst still can be freed from carbon by the process of this invention. In the case of the Cyclone separator the gas velocity can easily be adjusted so that the carbon is blown out in the effluent stream while the more dense catalyst is thrown to the sides of the Cyclone separator in the usual manner and returned to the reactor. If a screen is used, the carbon particles are reduced to such a size that they easily pass through the screen in the effluent gas stream while the catalyst is returned to the reactor. The gas utilized for abrading the carbonaceous deposits may be any gas nonreactive with the deposits under conditions of the process. Inert gases such as nitrogen may be utilized as well as hydrogen, the synthesis gas mixture itself, or even air, provided oxidizing temperatures are not present.

If it is not desired to carry out the reactivation in the reactor, the reactivation process may be performed after either continuous or intermittent removal of a portion of the catalyst to a regenerator separate from the reactor where the regeneration step is performed. After being freed from the carbonaceous matter, the catalyst is returned to the reactor. This provides a means for utilizing this invention in a separate chamber without necessitating an interruption of the synthesis process.

This invention is particularly adaptable to reactions which are conducted in the presence of non-porous, metallic catalysts and which are accompanied by deposition of the carbonaceous material chiefly on the surface of the catalyst so that the deposit can be removed readily by abrasion. The flow rate used in the process of this invention may vary between the minimum flow rate required for fluidization and the transport velocity; more specifically, the flow rate may be estimated as about 0.6 to 5.5 feet per second apparent linear velocity. The exact velocity used in any particular case would, of course, depend on the specific apparatus design and other factors which would be considered in ordinary engineering practice. These velocities overlap those generally used in the synthesis reaction itself and some abrasion of carbon would probably occur during the reaction, but inasmuch as carbon formation is also occurring simultaneously, there is no substantial decrease in surface carbon. Thus, the abrasion must be carried out under conditions such that little or no synthesis reaction will occur. The temperature at which this invention is carried out is not critical provided no hydrocarbon synthesis and no oxidation occur. If the invention is practiced in the reactor, the ordinary reaction temperatures could be utilized, although other temperatures, for example room temperature, might be used, particularly if the carbon removal is conducted in a vessel other than the reactor.

In Figure 1 of the accompanying drawings, the process is carried out by regeneration in situ. Cyclone separator 1 is used to separate the catalyst and to return the catalyst to reactor 2. The carbonaceous matter and the regenerating gas are withdrawn through effluent line 3. The catalyst is returned to the reactor through standpipe 4, and it is again picked up by the regenerating gas stream entering through line 5 at the bottom of the reactor.

Figure 2 indicates an alternate method of reactivating the catalyst in a regenerator 6, separate from the reactor 7, which is provided with inlet 10 and outlet 11. The catalyst is withdrawn from the reactor either continuously or intermittently through valve 8, and, after reactivation by passing a regenerating gas such as hydrogen through valved inlet 13 and upwardly through the regenerator, the catalyst is returned to the reactor through line 9 by the application of pressure within regenerator 6. Valved line 12 is used for removing the carbon-containing regeneration gas and for applying inert gas pressure for returning the decarbonized catalyst to reactor 7. The reactivated catalyst is picked up by the influent synthesis gas entering the reactor through line 10.

*Example*

A fluidized iron catalyst of 100–250 mesh whose activity had declined until it was giving only 70% conversion at a space velocity of 1500 volumes of synthesis gas per volume of catalyst per hour was treated with hydrogen at 300° C. at a linear velocity of one foot per second for 5 hours. During this time carbon was found to come off the catalyst, and, when the synthesis process was resumed in the reactor, the activity of the catalyst had increased to 90% conversion at a space velocity of 2500 volumes of synthesis gas per volume of catalyst per hour and at a substantially lower temperature than that used previously.

Other metallic catalysts generally used in carrying out synthesis reactions of the type described herein may also be regenerated in accordance with the present invention. In addition to iron, sintered or otherwise, cobalt or nickel is commonly used. In the operation of the synthesis reaction, the ratio of hydrogen to carbon monoxide will vary depending on the catalyst. For nickel and cobalt catalysts, the optimum ratio is two parts by volume of hydrogen to one of carbon monoxide. For iron catalysts, the optimum range is between 1.5 and 1 volumes of hydrogen per volume of carbon monoxide. The temperatures at which the reaction may be carried out also vary with the catalyst employed. With nickel and cobalt the broad temperature range is 180° to 350° C., the preferred range being 180° to 220° C. With iron catalysts temperatures between 240° and 320° C. are normally employed but temperatures as high as 480° C. may be utilized, particularly at reaction pressures in excess of about 50 atmospheres.

The above example is a preferred embodiment of my invention, but I do not limit myself to the specific details since alternative methods of performing my invention will be obvious to those skilled in the art from my disclosure.

I claim:

1. A process for the reactivation of a finely divided metallic catalyst which has been deactivated by deposition of carbon on the surface thereof during the synthesis of hydrocarbons from carbon monoxide and hydrogen which comprises suspending said finely divided metallic catalyst as a fluidized mass in a gas inert to said surface deposited carbon at the temperature of suspending whereby said finely divided metallic catalyst is brought into contact with itself to abrade said surface deposited carbon from the surface thereof, and removing the abraded carbon in the effluent gas stream.

2. A process for the reactivation of a finely divided iron catalyst which has been deactivated by deposition of carbon on the surface thereof during the synthesis of hydrocarbons from carbon monoxide and hydrogen which comprises suspending said finely divided iron catalyst as a fluidized mass in a gas inert to said surface deposited carbon at the temperature of suspending whereby said finely divided metallic catalyst is brought into contact with itself to abrade said surface deposited carbon from the surfaces thereof, and removing the abraded carbon in the effluent gas stream.

3. A process for the reactivation of a finely divided iron catalyst which has been deactivated by deposition of carbon on the surface thereof during the synthesis of hydrocarbons from carbon monoxide and hydrogen which comprises suspending said finely divided iron catalyst as a fluidized mass in a gas inert to said surface deposited carbon at the temperature of suspending in the reactor in which said synthesis had been carried out whereby said finely divided iron catalyst is brought into contact with itself to abrade said surface deposited carbon from the surface thereof and removing the abraded carbon in the effluent gas stream.

4. A process for the reactivation of a finely divided iron catalyst which has been deactivated by deposition of carbon on the surface thereof during the synthesis of hydrocarbons from carbon monoxide and hydrogen which comprises removing said catalyst from the reactor in which the synthesis has been carried out, suspending said catalyst as a fluidized mass in a gas inert to said surface deposited carbon at the temperature of suspending whereby said catalyst is brought into contact with itself to abrade said surface deposited carbon from the surface thereof, removing the abraded carbon in the effluent gas stream and returning the resulting reactivated catalyst to said reactor.

5. A process for the reactivation of a finely divided iron catalyst which has been deactivated by deposition of carbon on the surface thereof during the synthesis of hydrocarbons from carbon monoxide and hydrogen which comprises removing catalyst continuously from the reactor while the synthesis is being carried out, suspending the withdrawn catalyst as a fluidized mass in a gas inert to said surface deposited carbon at the temperature of suspending whereby said catalyst is brought into contact with itself to abrade said surface deposited carbon from the surface thereof, removing the abraded carbon in the effluent gas stream and returning the resulting reactivated catalyst to said reactor.

6. A process for the reactivation of a finely divided iron catalyst which has been deactivated by deposition of carbon on the surface thereof during the synthesis of hydrocarbons from carbon monoxide and hydrogen which comprises suspending said catalyst as a fluidized mass in a gaseous mixture consisting essentially of carbon monoxide and hydrogen suitable for the synthesis of hydrocarbons at a temperature below that at which the synthesis reaction is effected whereby said finely divided catalyst is brought into contact with itself to abrade said surface deposited carbon from the surface thereof and removing the abraded carbon in the effluent gas stream.

7. A process for the reactivation of a finely divided iron catalyst which has been deactivated by deposition of carbon on the surface thereof during the synthesis of hydrocarbons from carbon monoxide and hydrogen which comprises suspending said catalysts as a fluidized mass in a gas consisting essentially of hydrogen at a temperature at which hydrogen is inert to said surface deposited carbon whereby said catalyst is brought into contact with itself to abrade said surface deposited carbon from the surface thereof and removing the abraded carbon in the effluent hydrogen gas stream.

8. A process for the reactivation of a finely divided iron catalyst which has been deactivated by deposition of carbon on the surface thereof during the synthesis of hydrocarbons from carbon monoxide and hydrogen which comprises suspending said catalyst as a fluidized mass in a stream of air under non-oxidizing conditions to said surface deposited carbon whereby said catalyst is brought into contact with itself to abrade said surface deposited carbon from the surface thereof and removing the abraded carbon in the effluent air stream.

ALVIN H. FRIEDMAN

REFERENCES CITED

The following references are of record in the file of this patent:

UNITED STATES PATENTS

| Number | Name | Date |
| --- | --- | --- |
| 1,296,367 | Cochran | Mar. 4, 1919 |
| 2,325,611 | Keranen | Aug. 3, 1943 |
| 2,355,831 | Voorhees | Aug. 15, 1944 |
| 2,377,512 | Pages | June 5, 1945 |
| 2,410,284 | Gunness et al. | Oct. 29, 1946 |
| 2,419,255 | Dely | Apr. 22, 1947 |
| 2,435,158 | Read | Jan. 27, 1948 |
| 2,455,419 | Johnson | Dec. 7, 1948 |
| 2,462,861 | Gunness | Mar. 1, 1949 |
| 2,487,159 | McAdams et al. | Nov. 8, 1949 |
| 2,481,841 | Hemminger | Sept. 13, 1949 |